(12) United States Patent
Lee-Smith

(10) Patent No.: US 8,361,277 B2
(45) Date of Patent: Jan. 29, 2013

(54) EVAPORATOR AND METHOD OF OPERATION THEREOF

(75) Inventor: Donald Roger Lee-Smith, Semer (GB)

(73) Assignee: Genevac Limited, Ipswich, Suffolk, IP1 5AP (GB)

( * ) Notice: Subject to any disclaimer, the term of this patent is extended or adjusted under 35 U.S.C. 154(b) by 869 days.

(21) Appl. No.: 12/294,363

(22) PCT Filed: Mar. 14, 2007

(86) PCT No.: PCT/GB2007/000886
§ 371 (c)(1),
(2), (4) Date: Dec. 15, 2008

(87) PCT Pub. No.: WO2007/128950
PCT Pub. Date: Nov. 15, 2007

(65) Prior Publication Data
US 2009/0107640 A1   Apr. 30, 2009

(30) Foreign Application Priority Data
Apr. 25, 2006  (GB) .................................. 0608111.1

(51) Int. Cl.
B01D 3/08    (2006.01)
B01D 3/10    (2006.01)
B01D 3/30    (2006.01)
B01D 1/00    (2006.01)

(52) U.S. Cl. .................. 159/6.1; 159/47.1; 159/DIG. 6; 159/DIG. 15; 159/DIG. 16; 202/205; 202/235; 202/238; 202/266; 202/267.1; 203/22; 203/91; 203/100; 203/DIG. 4; 203/DIG. 8

(58) Field of Classification Search .................. 159/6.1, 159/44, 47.1, DIG. 6, DIG. 15, DIG. 16; 202/160, 205, 235, 238, 242, 266, 267.1; 203/2, 22, 27, 91, 100, DIG. 4, DIG. 8; 62/151, 62/238.7
See application file for complete search history.

(56) References Cited

U.S. PATENT DOCUMENTS
4,731,159 A    3/1988  Porter
5,334,130 A *  8/1994  Glater et al. ...................... 494/4
(Continued)

FOREIGN PATENT DOCUMENTS
DE    4319498 A1    11/1994
GB    2230203 A     10/1990
(Continued)

OTHER PUBLICATIONS
International Search Report in PCT/GB2007/000886.
(Continued)

Primary Examiner — Virginia Manoharan
(74) Attorney, Agent, or Firm — Barnes & Thornburg LLP

(57) ABSTRACT

An evaporator is provided for evaporation of liquid from a solution or liquid mixtures, together with methods of operation of the evaporator. The evaporator comprises a chamber (1); a liquid reservoir (3) for holding a heat transfer liquid exposed to the interior of the chamber; a support (6) for supporting a container (8) in the chamber, such that the liquid sample in the container is exposed to a fluid path (15) for connection to a condenser (16), the fluid path being separated from the chamber interior, and at least a portion of the container is closely thermally coupled to the chamber interior; and means (4) for heating the heat transfer liquid in the reservoir to create heat transfer liquid vapor, which in use condenses and releases latent heat of vaporization to the liquid sample in the container. As the temperature of the sample is dependent on the saturated vapor temperature of the liquid in the reservoir, the temperature of the samples is reliably limited, thereby avoiding overheating. High levels of heat energy may be delivered controllably to the samples, enabling a high evaporation rate to be achieved at relatively low temperature.

24 Claims, 1 Drawing Sheet

U.S. PATENT DOCUMENTS

| | | | |
|---|---|---|---|
| 5,348,623 A * | 9/1994 | Salmon | 203/1 |
| 5,409,576 A | 4/1995 | Tleimat | |
| 5,755,924 A | 5/1998 | Feres | |
| 6,605,474 B1 * | 8/2003 | Cole | 436/177 |
| 6,976,486 B2 * | 12/2005 | Thoma | 126/247 |
| 7,252,803 B2 * | 8/2007 | Guthrie et al. | 159/6.1 |
| 7,614,367 B1 * | 11/2009 | Frick | 122/26 |
| 2002/0092316 A1 * | 7/2002 | Kidwell | 62/499 |

FOREIGN PATENT DOCUMENTS

| | | |
|---|---|---|
| JP | 57-28701 | 7/1955 |
| JP | 58-079503 A | 5/1983 |
| JP | 02-164401 A | 6/1990 |
| JP | 04-260439 | 9/1992 |
| JP | 04-338242 A | 11/1992 |
| JP | 2000/317203 A | 11/2000 |
| RU | 1813468 A1 | 5/1993 |
| SU | 1579514 A1 | 7/1990 |

OTHER PUBLICATIONS

British Search Report in GB 0608111.1.

* cited by examiner

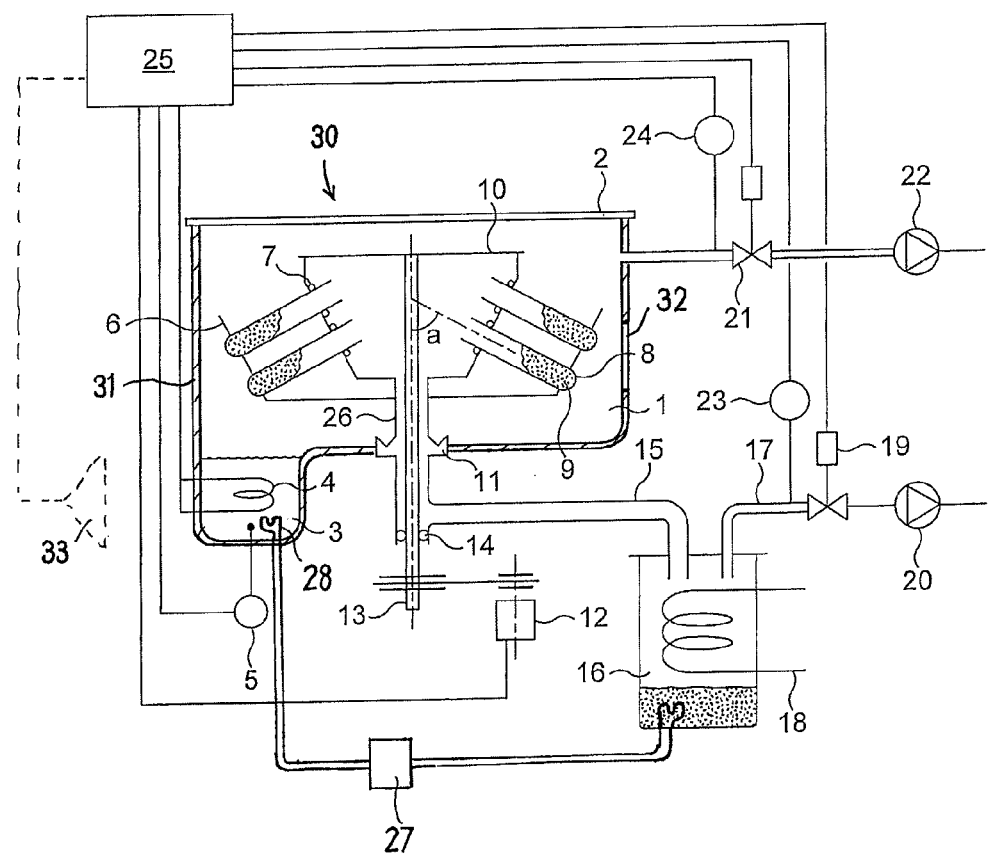

EVAPORATOR AND METHOD OF OPERATION THEREOF

FIELD OF THE INVENTION

The present invention relates to evaporators and processes for evaporation of liquid from a solution or liquid mixtures.

BACKGROUND OF THE INVENTION

Evaporation techniques are used extensively in chemistry and biology laboratories to separate a relatively volatile component from a liquid mixture, or to concentrate or dry compounds in solution.

In use, the pressure within an evaporator is reduced to a point at which the liquid component to be evaporated will boil at temperature that will not damage other components of the sample.

In known evaporators, centrifugal forces are often employed in order to reduce expulsion of the solution from the sample surface during heating by a process known as "bumping", which otherwise causes spillages and contamination of the evaporator.

Various methods are used to heat samples within an evaporator. Principally, irradiation is employed due to its ability to transmit through a vacuum. Two existing techniques involve, respectively:

1. The use of a conductive barrier in contact with the samples to receive the irradiation and prevent direct incidence of irradiation on the sample containers. The sample temperature may be closely monitored by measuring the temperature of the barrier, thereby allowing accurate temperature control to prevent the maximum sample temperature being exceeded; and
2. Direct irradiation of the sample containers.

A drawback of the first technique is that fabrication of a suitable barrier may be complex and costly. Also, the barrier may reduce the ability to transfer heat efficiently to the sample. With regard to the second technique, overheating of the samples may be prevented by making the source no hotter than the maximum sample temperature, but this substantially limits the rate of heat delivery.

SUMMARY OF THE INVENTION

An evaporator for evaporating a liquid component from a liquid sample in a container, comprising:
  a chamber;
  a liquid reservoir for holding a heat transfer liquid exposed to the interior of the chamber;
  a support for supporting said container in the chamber, such that the liquid sample in the container is exposed to a fluid path for connection to a condenser, the fluid path being separated from the chamber interior, and at least a portion of the container is closely thermally coupled to the chamber interior; and
  means for heating the heat transfer liquid in the reservoir to create heat transfer liquid vapour, which in use condenses and releases latent heat of vaporisation to the liquid sample in the container.

As the temperature of the sample is dependent on the saturated vapour temperature of the liquid in the reservoir, the temperature of the samples is reliably limited, thereby avoiding overheating. High levels of heat energy may be delivered controllably to the samples, enabling a high evaporation rate to be achieved at relatively low temperature.

In a preferred embodiment, the evaporator is a centrifugal evaporator and the support is rotatable. An evaporator embodying the invention may achieve an evaporation rate of the order of ten times that of a conventional centrifugal evaporator.

In another preferred embodiment, the evaporator is a rotary evaporator, in which the support is arranged to rotate the container about a longitudinal axis thereof, with the axis at an angle to the vertical.

In contrast to existing evaporators, a separate pre-heating procedure may not be necessary to prevent premature condensation of liquid evaporated from a sample within the evaporator. It can be seen that the liquid reservoir effectively pre-heats the chamber of the evaporator and its contents.

The present approach enables the sample temperature to be controlled by a non-rotating, chamber mounted heat source. Furthermore, as the heating temperature is limited by the boiling point of the liquid in the reservoir, relatively simple, high reliability sensors can be used to control the evaporator.

Preferably the chamber interior is coupled to evacuation means in order to reduce the pressure within the chamber. This may be used to reduce and so control the boiling point of the liquid in the reservoir. The pressure may be selected to ensure that the boiling point of the reservoir liquid does not exceed the maximum desired sample temperature. Reduction of the pressure within the chamber also reduces the amount of power required to rotate the support at a given speed, as the air resistance is lower.

As there is no requirement to dissipate heat from the evaporator when using the present technique in contrast to known approaches, the chamber may be thermally insulated, using a layer of insulating material for example. Alternatively, if no insulation is used, at least a portion of the chamber may be formed of transparent material to enable the interior to be visually monitored.

In embodiments where the container is exposed directly to the interior of the chamber, the evaporator may be arranged such that the sample is visible externally of the chamber, by using a transparent container, appropriately arranging the support, and providing a window in the chamber wall.

In a preferred embodiment, the chamber is configured such that heat transfer liquid therein collects in a localised region, where the reservoir is located. The reservoir may then be heated by directing heat energy towards this localised region. The reservoir may be defined by the wall of the chamber for example. Alternatively, the reservoir may be located outside the chamber with a fluid path provided between the reservoir and the chamber interior. The fluid path may be defined by a duct, for example.

The support may be configured to expose the container directly to the chamber interior. In this case, it is preferable to maximise the surface area of the container that is presented to the chamber interior, increasing the area for heat transfer. The manufacture of such a support may be somewhat less costly than the fabrication of a conductive barrier of the type referred to above and more straightforward. Its weight is also likely to be lower, reducing the size of motor and power consumption required to rotate the support.

Instead of exposing the sample container directly to the chamber interior, the support may provide a mount or socket of corresponding shape, which is itself exposed the chamber interior. This portion of the support is preferably formed of a material having a high thermal conductivity, to minimise the thermal resistance presented between the container and the chamber interior.

In embodiments in the form of a centrifugal evaporator, the support may be configured to hold the container at a fixed angle to the vertical. Alternatively, the container may be pivotally mounted, so that the lower end of the container swings radially outwards during rotation of the support. It may be advantageous to form the elements of the support that engage the container from a relatively flexible material such as plastic. This may reduce the stresses exerted on the container during rotation, and reduce so the risk of breakage of a container formed of glass or another brittle material.

References herein to a container also encompass use of a plurality of containers, with either one support for each container or one or more shared supports, each for two or more containers. Each container may hold a single sample, as in the case of a sample tube. Alternatively, the containers may be in the form of multiwell plates capable of carrying a large number of samples. Containers are typically formed of glass or a plastic, such as polypropylene. Sample tubes may be provided in a range of sizes, with the sample capacity ranging from 1 to 500 ml or more.

The heating means may be in the form of a heating element which in use is in contact with a heat transfer liquid in the reservoir. Alternatively, an infrared heater may be directed at the reservoir. Where the reservoir is defined by the wall of the chamber, the heater may accordingly be arranged to irradiate the outside surface of the relevant portion of the wall.

Fluid travelling along the fluid path from the container is prevented from mixing with the contents of the chamber. The path may lead out of the chamber for connection to an external condenser. Alternatively, the chamber may be arranged so as to be able to accommodate a condenser within it.

The evaporator may be arranged to transfer heat generated by an associated condenser to the liquid in the reservoir, making the system as a whole more energy efficient. For example, a heat pump may be employed to take heat energy from the condenser and transfer it to heat transfer liquid in the reservoir via a heat exchanger.

The present invention further provides a method of evaporating a liquid component from a liquid sample in a container using an evaporator as defined above, comprising the steps of:
(a) providing a heat transfer liquid in the reservoir;
(b) heating the heat transfer liquid held in the reservoir to create liquid vapour, which condenses and releases latent heat of vaporisation to the sample; and
(c) drawing liquid component evaporated from the sample along the fluid path.

In a preferred embodiment, the support is rotatable, and the container is rotated by the support.

The present invention also provides a method of evaporating a liquid component from a liquid sample in a container by heating the container to a predetermined temperature, comprising the steps of:
(a) selecting a heat transfer liquid to act as a heat transfer medium which at a given pressure has a saturated vapour temperature equal to the temperature to which it is desired to heat the sample;
(b) mounting the container in a chamber;
(c) providing a reservoir of the heat transfer liquid which is exposed to the interior of the chamber;
(d) exposing the sample to a fluid path for connection to a condenser, the fluid path being separated from the chamber interior;
(e) adjusting the pressure of the chamber interior to said given pressure; and
(f) heating the heat transfer liquid to create heat transfer liquid vapour, which condenses and releases latent heat of vaporisation to the sample.

The liquid to be used as the heat transfer medium is selected so that, at a pressure achievable within the chamber of the evaporator, it has a saturated vapour temperature corresponding to the temperature at which the sample is to be heated. In many cases, water may be a suitable liquid to use. Its saturated vapour temperature may be reduced to around 40° C., a typical sample heating temperature, by reducing the chamber pressure to around 70 mbar. It is of course non-toxic and readily available. Preferably distilled water is used to avoid build-up of mineral deposits in the evaporator.

In a pressurised system, a liquid having a relatively low boiling point may be employed, such as a refrigerant. In that case, the pressure within the chamber is increased in use to bring the boiling point of the liquid (and the saturated vapour temperature of its vapour) up to the desired working temperature.

The volume of water or other heat transfer medium to be used in the liquid reservoir is not critical, but it will be appreciated that the level of a reservoir at the base of the chamber should be below the support.

In embodiments where the sample container is exposed directly to the chamber interior, heat transfer liquid vapour condenses directly onto the exposed outer surface of the container. Where container is held within a corresponding mount or socket, condensation occurs on the outer surface of the socket, and the released latent heat of evaporation is conducted via the material of the socket to the container, and therethrough to the sample.

Accordingly to a further aspect of the invention, it may be possible to selectively open the fluid path to the chamber interior, allowing liquid vapour in the chamber to pass along the fluid path to a condenser and thereby defrost the condenser. In embodiments where the sample container is exposed directly to the chamber interior, this may be achieved simply by removing the container. A device may be provided specifically to allow opening of the fluid path to the chamber interior, such a valve.

BRIEF DESCRIPTION OF THE DRAWING

A centrifugal evaporator 30 embodying the present invention will now be described by way of example and with reference to the accompanying diagrammatic FIGURE.

DETAILED DESCRIPTION

A rotatable support in the form of a rotor 6 is mounted in a vacuum chamber 1. Sample tubes 8 containing a solution 9 are suspended on the rotor. As shown, the tubes are held at a fixed angle "a" to the rotational axis 13 of the rotor. Alternatively, they may be pivotally mounted on the rotor, so that the tubes adopt a radial orientation during rotation. The rotor is in the form of a framework which exposes a large proportion of the outer surface of each tube to the interior of the chamber. The rotor is driven by a motor 12. It may exert an acceleration of between 2000 and 5000 m/s$^2$ on the tubes, for example.

The open end of each tube is surrounded by a seal 7. When the tubes have been inserted, a closure 10 closes the access opening at the top of the rotor. The open end of the tubes are then separated by the rotor from the interior of the chamber surrounding the rotor. The chamber is in turn sealed by closing lid 2.

The rotor includes a rotating duct 26 which is coupled to the wall of the sample chamber by a rotating seal 11. A lip seal 14 seals around the rotor shaft to maintain the liquid vapour vacuum within the rotor. Alternatively, the rotor shaft within the chamber may be driven via a magnetic coupling across the wall of the chamber, for example. A static duct 15 continues the fluid path through the rotating duct outside the chamber and leads to a condenser 16, which may include refrigeration coils 18.

A further duct 17 leading from the condenser is connected via a valve 19 to a first vacuum pump 20 which is used to rapidly remove large amounts of solvent from the volume enclosed by the rotor. The pressure within the rotor is monitored by vacuum gauge 23.

A water reservoir 3 is defined by a wall of the chamber. A heater 4 is provided for heating liquid in the reservoir and thermostatically controlled using a temperature sensor 5. Alternatively an infrared heater 33 may be directed at the reservoir 3 to heat liquid in the reservoir.

A second vacuum pump 22 is connected via a valve 21 to the chamber interior. It is used to reduce the pressure in the chamber, which is monitored by vacuum gauge 24. The pressure in the chamber may be reduced to between 10 and 300 mbar, for example.

The evaporator is controlled using a controller 25.

A heat pump 27 is provided to take heat energy from the condenser 16 and transfer it to heat transfer liquid in the reservoir 3 via a heat exchanger 28.

The chamber is thermally insulated by insulating layer 31. A portion 32 of the chamber is formed of transparent material to enable the interior to be visually monitored. Containers 8 are visible through the portion 32 of transparent material.

In operation of the evaporator, both the chamber and rotor are evacuated. The pressure within the rotor may be reduced to 500 mbar or less for example, and as low as around 0.001 mbar.

Heater 4 is used to heat liquid in the reservoir 3. As a result of the reduced pressure within the chamber, the liquid will boil at a lower temperature than if it were at atmospheric pressure. The liquid samples are heated to the boiling point of the constituent to be evaporated. This evaporation process cools the samples and therefore the walls of the tubes in contact with the samples as the evaporating constituent extracts its latent heat of evaporation.

When the temperature of the outside surface of the tubes falls below the saturated vapour temperature of the liquid vapour in the chamber, the vapour condenses on the surfaces of the tubes, delivering significant levels of heat energy (as the vapour releases its latent heat of vaporisation) at constant temperature to the tubes. By this mechanism the tubes are not heated above the control temperature of the chamber, that is, the saturated vapour temperature of the liquid vapour at the reduced pressure of the chamber.

Liquid vapour condensed on the outside of the tubes is immediately thrown off by the rotation of the rotor, exposing the tube surfaces for further condensation to occur.

The invention claimed is:

1. A centrifugal evaporator for evaporating a liquid component from a liquid sample in a separate container having an open end, comprising:
   a chamber;
   a liquid reservoir for holding a heat transfer liquid exposed to the interior of the chamber;
   a rotatable support in the form of a rotor for removably supporting said container in the chamber, wherein the rotor includes a closure which closes an access opening in the rotor so that the rotor separates the open end of the container from the interior of the chamber surrounding the rotor, the liquid sample in the container being exposed to a fluid path for connection to a condenser, the fluid path being separated from the chamber interior by the rotor, and at least a portion of the container being closely thermally coupled to the chamber interior; and
   means for heating the heat transfer liquid in the reservoir to create heat transfer liquid vapor, which in use condenses and releases latent heat of vaporisation to the liquid sample in the container to evaporate said liquid component from the liquid sample.

2. An evaporator of claim 1 wherein the chamber interior is coupled to means for reducing the pressure within the chamber.

3. An evaporator of claim 1 wherein the chamber interior is coupled to means for increasing the pressure within the chamber.

4. An evaporator of claim 1 wherein the chamber is thermally insulated.

5. An evaporator of claim 1 wherein at least a portion of the chamber is formed of transparent material to enable the interior to be visually monitored.

6. An evaporator of claim 5 arranged such that said container mounted in the support is visible from outside the chamber during operation of the evaporator.

7. An evaporator of claim 1 wherein the heat transfer liquid condensed in the chamber collects in the reservoir.

8. An evaporator of claim 1 wherein the reservoir is defined by the wall of the chamber.

9. An evaporator of claim 1 wherein the reservoir is located outside the chamber and a fluid path is provided between the reservoir and the chamber interior.

10. An evaporator of claim 1 wherein the support exposes said container mounted therein directly to the chamber interior.

11. An evaporator of any of claim 1 wherein the support provides means for receiving said container, and at least a portion of the receiving means which is arranged to engage with a container therein is exposed to the chamber interior.

12. An evaporator of claim 1 wherein the heating means comprise a heating element for contacting heat transfer liquid in the reservoir.

13. An evaporator of claim 1 wherein the heating means comprise an infrared heater directed at the reservoir.

14. An evaporator of claim 1 wherein the fluid path to which a sample is exposed leads out of the chamber for connection to a condenser.

15. An evaporator of claim 1 wherein the fluid path to which a sample is exposed is arranged for connection to a condenser within the chamber.

16. An evaporator of claim 1 wherein a heat pump is provided to take heat energy from the condenser and transfer it to heat transfer liquid in the reservoir via a heat exchanger.

17. A method of evaporating a liquid component from a liquid sample in a container using a centrifugal evaporator of claim 1, comprising the steps of:
   (a) loading a container into the rotor;
   (b) closing the access opening in the rotor with the closure;
   (c) providing a heat transfer liquid in the reservoir;
   (d) heating the heat transfer liquid held in the reservoir to create heat transfer liquid vapor, which condenses and releases latent heat of vaporisation to the sample; and
   (e) drawing liquid component evaporated from the sample along the fluid path which is separated from the interior of the chamber by the rotor.

18. A method of claim 17 wherein the support is rotatable, and the container is rotated by the support.

19. A method of claim 17 including a further step of selectively opening to the chamber interior the fluid path from the sample to the condenser so as to defrost the condenser.

20. A method of evaporating a liquid component from a liquid sample in a container having an open end by heating the container to a predetermined temperature in a centrifugal evaporator, comprising the steps of:

(a) selecting a heat transfer liquid to act as a heat transfer medium which at a given pressure has a saturated vapor temperature equal to the temperature to which it is desired to heat the sample;

(b) mounting the container in a rotor in a chamber of the evaporator, wherein the rotor includes a closure which closes an access opening in the rotor so that the rotor separates the open end of the container from the interior of the chamber surrounding the rotor;

(c) closing the access opening of the rotor with the closure;

(d) providing a reservoir of the heat transfer liquid which is exposed to the interior of the chamber;

(e) exposing the sample to a fluid path for connection to a condenser, the fluid path being separated from the chamber interior by the rotor;

(f) adjusting the pressure of the chamber interior to said given pressure; and (g) heating the heat transfer liquid to create heat transfer liquid vapor, which condenses and releases latent heat of vaporisation to the sample.

21. A method of claim 20 wherein the container is mounted in a rotatable support in the chamber, and the container is rotated by the support.

22. A method of claim 20 wherein the heat transfer liquid vapor condenses in step (g) on the outer surface of the container.

23. A method of claim 20 wherein the container is mounted in a support in the chamber which closely thermally couples at least a portion of the container to the chamber interior, and the heat transfer liquid vapor condenses in step (g) on the support, releasing latent heat of vaporisation to the support, which in turn conducts heat energy to the sample via the container.

24. A method of claim 20 including a further step of selectively opening to the chamber interior the fluid path from the sample to the condenser so as to defrost the condenser.

* * * * *